United States Patent
Malik (10) Patent No.: US 9,730,049 B1
(45) Date of Patent: Aug. 8, 2017

(54) PROXIMITY DETECTION METHOD

(71) Applicant: TP Vision Holding B.V., Amsterdam (NL)

(72) Inventor: Salman Malik, Flanders (BE)

(73) Assignee: TP VISION HOLDING B.V., Amsterdam (NL)

( * ) Notice: Subject to any disclaimer, the term of this patent is extended or adjusted under 35 U.S.C. 154(b) by 0 days.

(21) Appl. No.: 15/384,684

(22) Filed: Dec. 20, 2016

(30) Foreign Application Priority Data

Sep. 27, 2016 (CN) .......................... 2016 1 0857374

(51) Int. Cl.
| | |
|---|---|
| *H04B 7/00* | (2006.01) |
| *H04W 8/00* | (2009.01) |
| *H04W 4/00* | (2009.01) |
| *H04B 5/00* | (2006.01) |
| *H04L 29/08* | (2006.01) |

(52) U.S. Cl.
CPC .......... *H04W 8/005* (2013.01); *H04B 5/0031* (2013.01); *H04L 67/12* (2013.01); *H04W 4/008* (2013.01)

(58) Field of Classification Search
CPC ..... H04W 8/005; H04W 4/008; H04B 5/0031
USPC ........................................................ 455/41.2
See application file for complete search history.

(56) References Cited

U.S. PATENT DOCUMENTS

| | | | | |
|---|---|---|---|---|
| 8,521,893 B2* | 8/2013 | Park | ....................... | H04W 8/005 370/343 |
| 8,812,657 B2* | 8/2014 | Mallik | .................. | H04W 8/005 370/338 |
| 8,855,134 B2* | 10/2014 | Tavildar | ................ | H04W 48/16 370/328 |
| 8,913,511 B2* | 12/2014 | Geirhofer | ............. | H04W 52/08 370/252 |
| 9,412,273 B2* | 8/2016 | Ricci | ....................... | H04W 4/22 |
| 9,485,069 B2* | 11/2016 | Wang | .................... | H04L 5/0053 |
| 9,516,686 B2* | 12/2016 | Barbieri | .............. | H04W 76/023 |
| 9,602,956 B1* | 3/2017 | Jin | ......................... | H04W 4/008 |
| 9,614,641 B2* | 4/2017 | Geirhofer | ................ | H04L 1/00 |

* cited by examiner

*Primary Examiner* — April G Gonzales
(74) *Attorney, Agent, or Firm* — Hamre, Schumann, Mueller & Larson, P.C.

(57) ABSTRACT

A proximity detection method implemented by a detecting device includes: (a) receiving detection signals from multiple signal providing devices that include a target device and at least one reference device; (b) for each of the detection signals, collecting signal strength values of the detection signal at a variety of time points; (c) filtering out a portion of the signal strength values based on a predetermined criterion; (d) for each of the detection signals, calculating a signal level according to a sum of the signal strength values; and (e) calculating proximity of the target device in relation to the at least one reference device according to the signal level.

16 Claims, 5 Drawing Sheets

PROXIMITY DETECTION METHOD

CROSS-REFERENCE TO RELATED APPLICATION

This application claims priority of Chinese Patent Application No. 201610857374.4, filed on Sep. 27, 2016.

FIELD

The disclosure relates to a distance detection method, and more particularly to a proximity detection method.

BACKGROUND

Bluetooth low energy (BLE) is a wireless personal area network technology that is suitable for indoor positioning, and is advantageous in having lower power consumption and cost in comparison to classic Bluetooth.

The BLE uses narrow-band signal and three different channels for broadcasting advertisements. However, the narrow bandwidth, frequency selective fading and directivity of antenna may cause large variations in the received signal strengths, resulting in poor proximity detection.

SUMMARY

Therefore, an object of the disclosure is to provide a proximity detection method that may have relatively higher precision.

According to the disclosure, the proximity detection method includes steps of: (a) receiving, by a detecting device, a plurality of detection signals respectively provided by a plurality of signal providing devices that includes a target signal providing device and at least one reference signal providing device, wherein the detecting device and the signal providing devices are in a same room; (b) for each of the detection signals, collecting, by the detecting device, a plurality of signal strength values of the detection signal at a variety of time points; (c) for each of the detection signals, filtering out, by the detecting device, a portion of the signal strength values based on a predetermined criterion; (d) for each of the detection signals, calculating, by the detecting device, a signal level according to a sum of the signal strength values that are remained after (c); and (e) calculating, by the detecting device, proximity of the target signal providing device associated with the at least one reference signal providing device according to the signal level calculated in step (d).

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
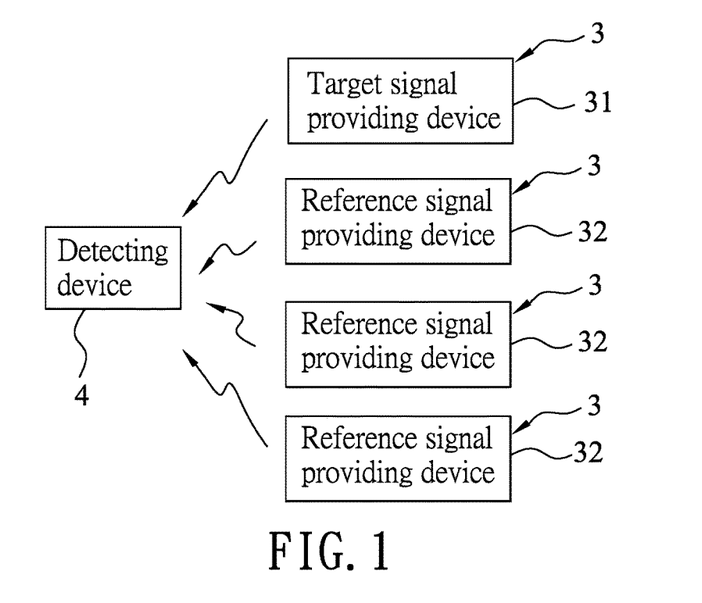
FIG. 1 is a block diagram illustrating devices to implement an embodiment of the proximity detection method according to the disclosure.
Figure 2:
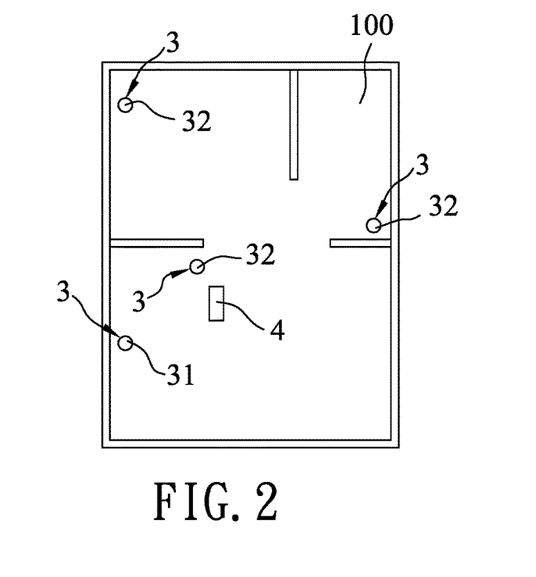
FIG. 2 is a schematic diagram exemplifying an environment of implementation of the embodiment.
Figure 3:
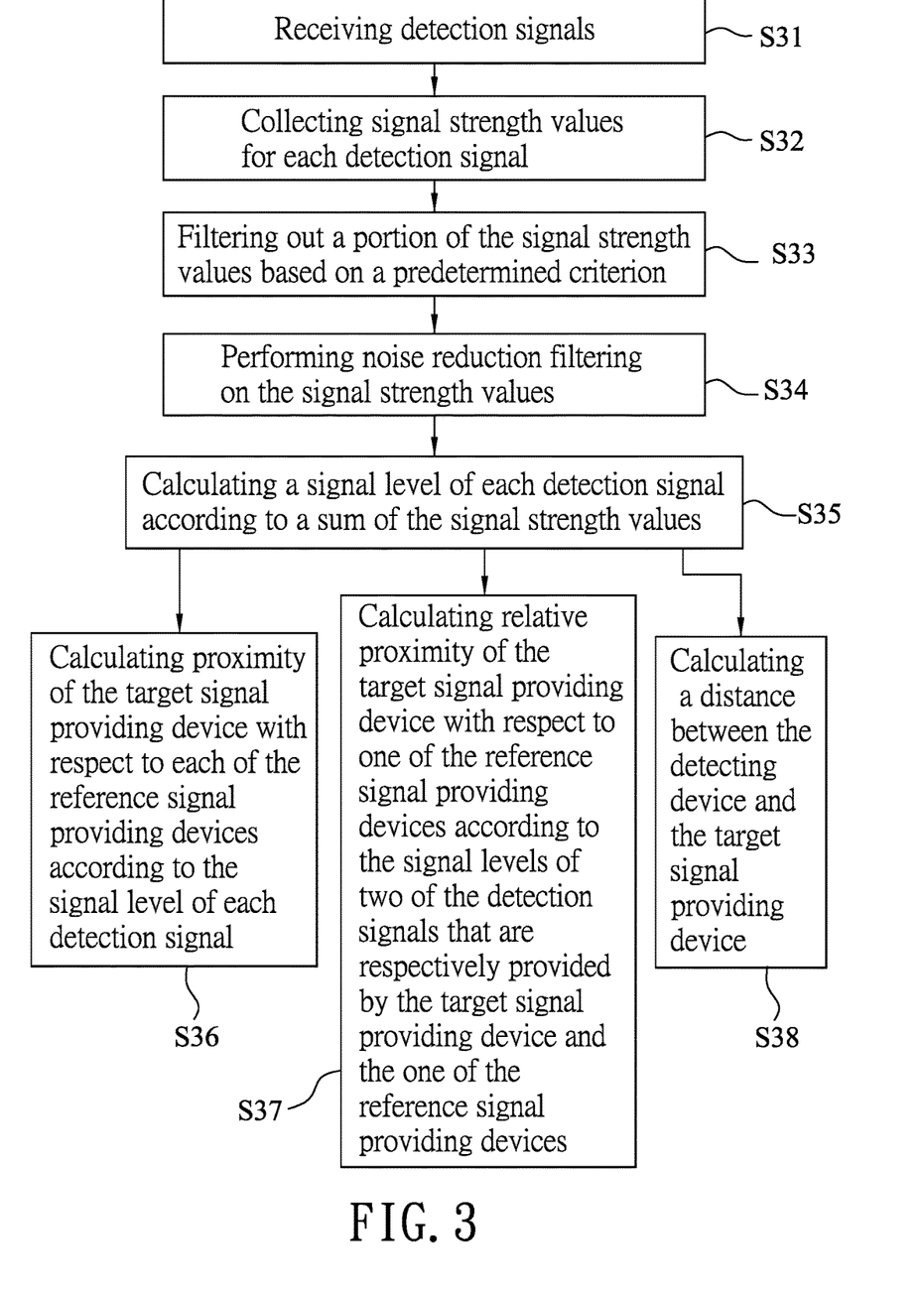
FIG. 3 is a flow chart illustrating steps of the embodiment.

Referring to FIGS. 1 to 3, the embodiment of the proximity detection method according to this disclosure may be implemented using a detecting device 4 (e.g., a mobile phone, a tablet computer, etc.) and a plurality of signal providing devices 3 (e.g., Bluetooth beacons) that are capable of communicating with the detecting device 4 via wireless technology (e.g., BLE).

In this embodiment, the detecting device 4 and the signal providing devices 3 are placed in the same room 100. The detecting device 4 wirelessly receives a plurality of detection signals respectively provided by the signal providing devices 3 (step S31). It is noted that, although the detecting device 4 may calculate the proximity of any one of the signal providing devices 3, it is exemplified in FIGS. 1 to 3 that the detecting device 4 calculates the proximity of one of the signal providing devices 3, which is named a target signal providing device 31, for the sake of brevity. On the other hand, the remaining signal providing devices 3 are named reference signal providing devices 32 for ease of description.

For each of the detection signals, the detecting device 4 collects/records a plurality of signal strength values (e.g., RSSI, abbreviated from received signal strength indicator) of the detection signal at a variety of time points within a predetermined length of time (step S32). When a number of the recorded signal strength values is less than a predetermined minimum number, the detecting device 4 may randomly duplicate a part of the recorded signal strength values, and randomly place the signal strength values thus duplicated among the originally recorded signal strength values, such that the a total number of the resultant signal strength values is not less than the predetermined minimum number. As an example, the detecting device 4 assembles RSSI values from advertisements sent by the beacons in a collection window that has a length determined according to a tradeoff between how fast the proximity can be calculated and the accuracy of the calculated proximity. In this example, the length of the collection window is twenty five RSSI values, which means that if an interval between consecutive advertisements sent from each beacon is 100 milliseconds, time needed for the collection window would be 2.5 seconds. However, in a case that the detecting device 4 fails to collect, for one or more beacons, a desired number of the RSSI values in the collection window, the collection window shall be packed to match a minimum desired length for each beacon. Therefore, additional samples may be placed randomly in the collection window, and the RSSI values of the additional samples are selected randomly from the RSSI values that are previously recorded from the corresponding beacons. This is to ensure that the distribution of received RSSI values is not disturbed at this stage.

For each of the detection signals, the detecting device 4 then filters out a portion of the signal strength values based on a predetermined criterion (step S33). In this embodiment, the detecting device 4 filters out, for each of the detection signals, a predetermined percentage of smallest signal strength values, since excessively low signal strength values may not be representative of the actual signal strength. In other words, the predetermined criterion is the predetermined percentage of smallest signal strength values in this embodiment, but this disclosure is not limited thereto. In addition, after this step, the detecting device 4 may implement the random duplication as described previously to make the total number of the resultant signal strength values not less than the predetermined minimum number (e.g., repack the collection window), and perform noise reduction filtering on the signal strength values (step S34). In one experiment, the detecting device 4 filtered out 20% of smallest RSSI values from the collection window, and then applied 3-point moving average finite impulse response (FIR) filter, but this disclosure is not limited to such.

In step S35, the detecting device 4 calculates, for each of the detection signals, a signal level according to a sum of the signal strength values of the detection signal that remain after step S34. In detail, the detecting device 4 offsets each of the signal strength values that remain after step S34 according to a minimum among all of the signal strength values of all of the detection signals that remain after step S34, and sums up, for each detection signal, the corresponding signal strength values thus offset to obtain the signal level. The calculation may be expressed by $$\gamma_i = \Sigma(S_i - \min(S_k)) \text{ for all } k \in \text{ collection window} \quad (1),$$

where $\gamma_i$ represents the signal level of an $i^{th}$ one of the detection signals, $S_i$ represents one of the signal strength values of the $i^{th}$ one of the detection signals that remain after step S34, and $S_k$ represents the signal strength values of all of the detection signals that remain after step S34.

Then, the detecting device 4 calculates the proximity of the target signal providing device 31 in relation to the reference signal providing devices 32 according to the signal levels of the detection signals. In one application, the detecting device 4 calculates proximity of the target signal providing device 31 with respect to each of the reference signal providing devices 32 (step S36) according to $$P_i = \frac{\gamma_i}{\sum_{k \neq i} \gamma_k}, \quad (2)$$

where $P_i$ represents the proximity of the target signal providing device 31 with respect to each of the reference signal providing devices 32, $\gamma_i$ represents the signal level of one of the detection signals that is provided by the target signal providing device 31, and $\gamma_k$ represents the signal level of one of the detection signals that is provided by one of the reference signal providing devices 32. In another application, the detecting device 4 calculates relative proximity of the target signal providing device 31 with respect to one of the reference signal providing devices 32 (step S37) according to the signal levels of two of the detection signals that are respectively provided by the target signal providing device 31 and the one of the reference signal providing devices 32. The calculation may be expressed by $$P_{ij} = \frac{\gamma_i}{\gamma_i + \gamma_j}, \quad (3)$$

where $P_{ij}$ represents the relative proximity of the target signal providing device 31 with respect to a $j^{th}$ one of the reference signal providing devices 32, $\gamma_i$ represents the signal level of one of the detection signals that is provided by the target signal providing device 31, and $\gamma_j$ represents the signal level of one of the detection signals that is provided by the $j^{th}$ one of the reference signal providing devices 32.

Furthermore, the detecting device 4 may calculate a distance between the detecting device 4 and the target signal providing device 31 (step S38) according to $$S_i = -10\alpha \log_{10}(d_i) + S_0(d_0) \quad (4),$$

where $S_i$ represents a representative signal strength value associated with the recorded signal strength values (e.g., the most likely RSSI value which is an RSSI value appearing the most often among all the collected RSSI values) of one of the detection signals that is provided by the target signal providing device 31, $\alpha$ is a path loss exponent that depends on the environment, $d_i$ represents the distance between the detecting device 4 and the target signal providing device 31, and $S_0(d_0)$ is a representative calibration signal strength value. For instance, if the collected RSSI values are −91, −91, −92, −91, −93, −91, −94, −89, −87 and −93 (unit: dBm), the most likely RSSI value that serves as the representative signal strength value ($S_i$) is −91 dBm. If there are two RSSI values having the same appearance frequency, the representative signal strength value ($S_i$) may be obtained by averaging the two RSSI values. Alternatively, a median of the collected RSSI values may also serve as the representative signal strength value ($S_i$). However, the disclosure is not limited to those mentioned above. It is noted that the path loss exponent ($\alpha$) and the representative calibration signal strength value ($S_0(d_0)$) may be obtained via a calibration process.

Figure 4:
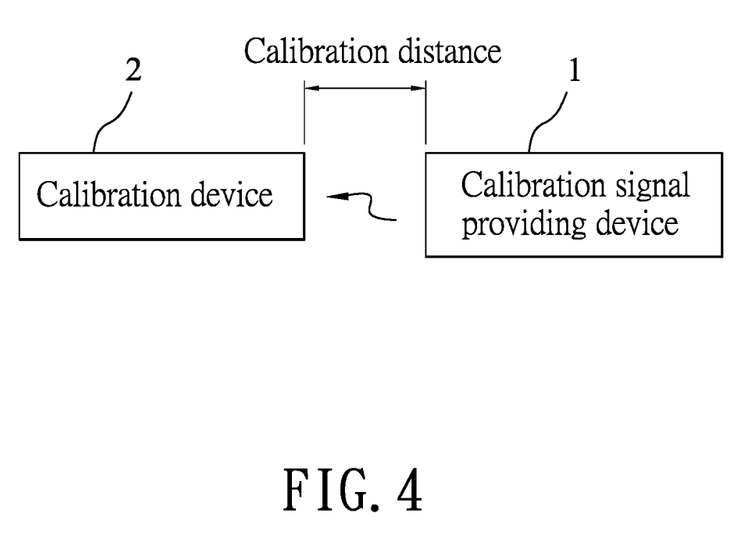
FIG. 4 is a block diagram illustrating devices to implement a calibration process of the embodiment.
Figure 5:
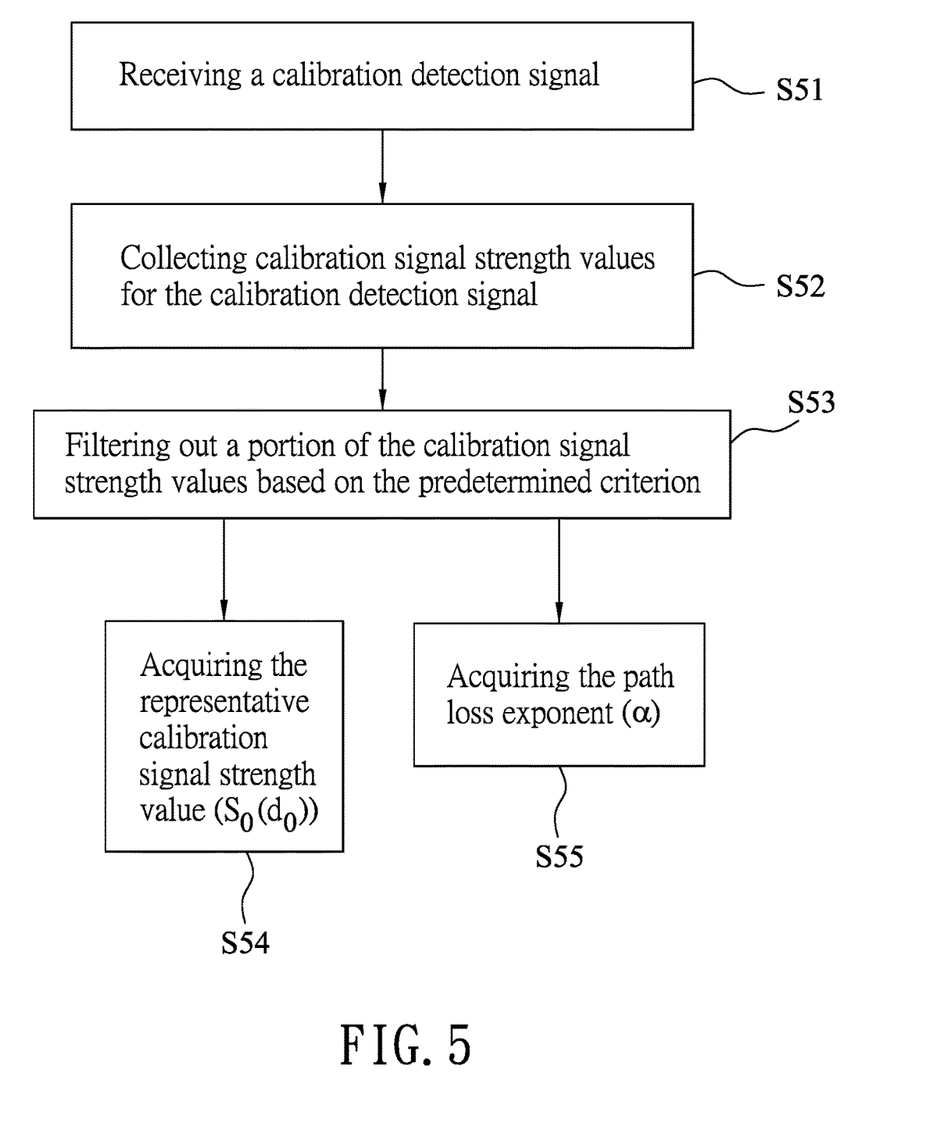
FIG. 5 is a flow chart illustrating steps of the calibration process of the embodiment.

Referring to FIGS. 4 and 5, an embodiment of the calibration process of the proximity detection method according to this disclosure is implemented using a calibration signal providing device 1 (e.g., a beacon) and a calibration device 2 capable of communicating with the calibration signal providing device 1 via wireless technology (e.g., BLE).

In step S51, the calibration device 2 wirelessly receives a calibration detection signal provided by the calibration signal providing device 1. The calibration device 2 and the calibration signal providing device 1 are disposed apart from each other by a calibration distance in a same room, and the calibration distance is selected from a plurality of predetermined distances (e.g., 1, 2, 3 and 5 meters).

In step S52, for each of the predetermined distances serving as the calibration distance, the calibration device 2 collects a plurality of calibration signal strength values of the calibration detection signal at a variety of time points.

In step S53, for each of the predetermined distances serving as the calibration distance, the calibration device 2 filters out a portion of the calibration signal strength values based on the predetermined criterion.

In step S54, the representative calibration signal strength value ($S_0(d_0)$) is acquired according to the calibration signal strength values that remain after step S53 and that correspond to one of the predetermined distances ($d_0$). In one example where $d_0$ equals one meter, the representative calibration signal strength value $S_0(1 \text{ m})$ may be the most likely value (i.e., the value that appears the most often) among the RSSI values collected at the calibration distance of 1 m.

Figure 6:
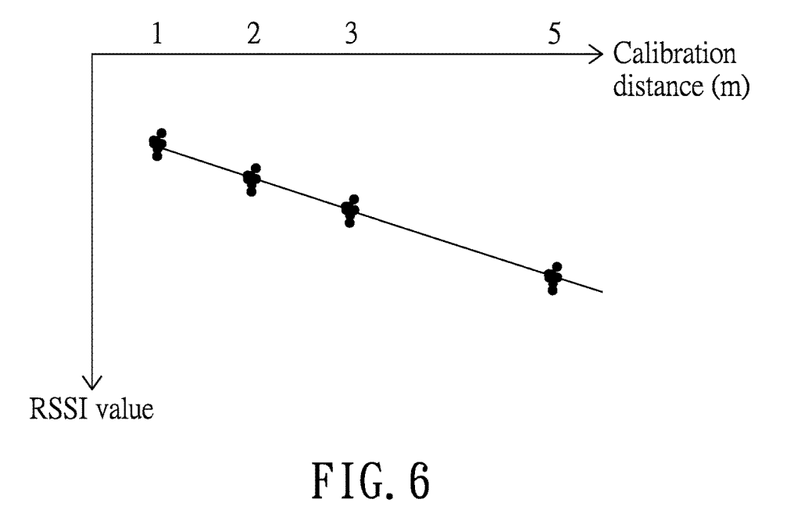
FIG. 6 is a plot exemplifying a step of acquiring a path loss exponent.

In step S55, the path loss exponent ($\alpha$) is acquired based on the calibration signal strength values that remain after step S53 (i.e., the filtered calibration signal strength values). Referring to FIG. 6, a linear fitting curve may be obtained by performing curve fitting on the calibration signal strength values that remain after step S53 with respect to each of the predetermined distances serving as the calibration distance, and the path loss exponent may thus be obtained based on the linear fitting curve.

In practice, directivity of the antenna of the detecting device 4 may impact precision of calculating the distance ($d_i$) between the detecting device 4 and the target signal providing device 31. Accordingly, the embodiment of the proximity detection method according to this disclosure may include two approaches in order to mitigate the impact of directivity of the antennas, and thus correct the calculated distance ($d_i$).

Figure 7:
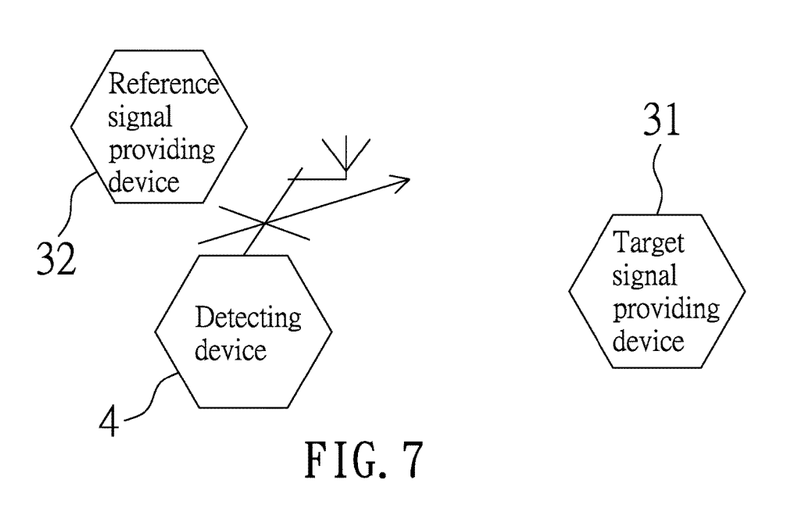
FIG. 7 is a schematic diagram exemplifying a condition in which a first approach for mitigating impact of directivity of an antenna of a detecting device according to this disclosure.

Referring to FIG. 7, assuming that an actual first distance between the detecting device 4 and the target signal providing device 31 is $d_1$, and an actual second distance between the detecting device 4 and one reference signal providing device 32 is $d_2$, a calculated first distance ($d_1'$) calculated in step S38 may be smaller than the actual first distance ($d_1$), and a calculated second distance ($d_2'$) calculated in step S38 may be greater than the actual second distance ($d_2$) because loss would be higher for the detection signal received from the reference signal providing device 32 than that received from the target signal providing device 31 due to the orientation of the antenna of the detecting device 4 and the dominant direction of the antenna directivity. In the first approach, the detecting device 4 corrects the distance ($d_1'$) between the detecting device 4 and the target signal providing device 31 according to $$d_1'' = \frac{(1+P_{21})^\alpha}{(1+P_{12})^\alpha} d_1', \quad (5)$$

where $d''_1$ represents the distance thus corrected, $P_{12}$ represents the relative proximity of the target signal providing device 31 with respect to the reference signal providing device 32, and $P_{21}$ represents the relative proximity of the reference signal providing device 32 with respect to the target signal providing device 31. It is noted that the relative proximity $P_{12}$ and $P_{21}$ may be calculated according to equation (3), and the reference signal providing device 32 used in this approach may be a nearest one of the reference signal providing devices 32 with respect to the detecting device 4.

In the second approach, the detecting device 4 corrects the signal strength values collected/recorded in step S32. In detail, after collecting/recording a plurality of the signal strength values for each of the detection signals at a variety of time points, the detecting device 4 corrects each of the signal strength values according to $$S_i = \frac{S_{io}}{\max(\cos\theta, 0.5)}, \quad (6)$$

where $S_{io}$ represents the signal strength value collected/recorded by the detecting device 4, $S_i$ represents the signal strength value thus corrected, and $\theta$ represents an angle between a directivity direction of the antenna of the detection device 4 and a propagation direction of one of the detection signals that corresponds to the signal strength value. By correction of the signal strength values, impact resulting from the directivity of the antenna may be mitigated, thereby promoting precision of the calculated proximity and the calculated distance from the signal providing devices 3. In practice, the first and second approaches may be applied together, and the disclosure is not limited thereto.

In summary, by use of the embodiment of the proximity detection method according to this disclosure, the detecting device 4 may calculate the proximity of one of the signal providing devices 3 with respect to at least another one of the signal providing devices 33 with higher precision by filtering out a portion of the signal strength values based on the predetermined criterion. In addition, by virtue of the first and second approaches, the calculated distance and the signal strength values may be corrected, thereby mitigating impact from the directivity of the antenna of the detecting device 4.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A proximity detection method comprising steps of:
   (a) receiving, by a detecting device, a plurality of detection signals respectively provided by a plurality of signal providing devices that include a target signal providing device and at least one reference signal providing device, wherein the detecting device and the signal providing devices are in a same room;
   (b) for each of the detection signals, collecting, by the detecting device, a plurality of signal strength values of the detection signal at a variety of time points;
   (c) for each of the detection signals, filtering out, by the detecting device, a portion of the signal strength values based on a predetermined criterion;
   (d) for each of the detection signals, calculating, by the detecting device, a signal level according to a sum of the signal strength values that remain after step (c); and
   (e) calculating, by the detecting device, proximity of the target signal providing device in relation to the at least one reference signal providing device according to the signal level calculated in step (d).

2. The proximity detection method of claim 1, wherein step (c) includes: for each of the detection signals, filtering out, by the detecting device, a predetermined percentage of smallest signal strength values.

3. The proximity detection method of claim 1, further comprising: before step (d), for each of the detection signals, performing, by the detecting device, noise reduction filtering on the signal strength values that remain after step (c).

4. The proximity detection method of claim 1, wherein step (d) includes sub-steps of: (d-1) offsetting each of the signal strength values that remain after step (c); and (d-2) for each of the detection signals, summing up the signal strength values that are offset in sub-step (d-1) and that correspond to the detection signal, to obtain the corresponding signal level.

5. The proximity detection method of claim 4, wherein each of the signal strength values that remain after step (c) is offset according to a minimum among all of the signal strength values remain after step (c).

6. The proximity detection method of claim 1, wherein the at least one reference signal providing device includes a plurality of reference signal providing devices, and the proximity calculated in step (e) includes proximity of the target signal providing device with respect to each of the reference signal providing devices, which is calculated according to the signal level of each of the detection signals.

7. The proximity detection method of claim 1, wherein the proximity calculated in step (e) includes proximity of the target signal providing device with respect to one of the at least one reference signal providing device, which is calculated according to the signal level of one of the detection signals that is provided by the target signal providing device, and the signal level of one of the detection signals at is provided by the one of the at least one reference signal providing device.

8. The proximity detection method of claim 1, wherein, in step (d), for each of the detection signals, the corresponding signal level is calculated according to $\gamma_i = \Sigma(S_i - \min(S_k))$, where $\gamma_i$ represents the signal level corresponding to an $i^{th}$ one of the detection signals, $S_i$ represents one of the signal strength values of the $i^{th}$ one of the detection signals that remain after step (c), $S_k$ represents the signal strength values of all of the detection signals that remain after step (c).

9. The proximity detection method of claim 8, wherein the proximity calculated in step (e) includes proximity of the target signal providing device with respect to each of the at least one reference signal providing device, which is calculated according to $$P_i = \frac{\gamma_i}{\sum_{k \neq i} \gamma_k},$$

where $P_i$ represents the proximity of the target signal providing device with respect to each of the at least one reference signal providing device, $\gamma_i$ represents the signal level of one of the detection signals that is provided by the target signal providing device, and $\gamma_k$ represents the signal level of one of the detection signals that is provided by one of the at least one reference signal providing device.

10. The proximity detection method of claim 8, wherein the proximity calculated in step (e) includes proximity of the target signal providing device with respect to one of the at least one reference signal providing device, which is calculated according to $$P_{ij} = \frac{\gamma_i}{\gamma_i + \gamma_j},$$

where $P_{ij}$ represents the proximity of the target signal providing device with respect to a $j^{th}$ one of the at least one reference signal providing device, $\gamma_i$ represents the signal level of one of the detection signals that is provided by the target signal providing device, and $\gamma_j$ represents the signal level of one of the detection signals that is provided by the $j^{th}$ one of the at least one reference signal providing device.

11. The proximity detection method of claim 1, wherein step (b) includes sub-steps of:
(b-1) for each of the detection signals, recording, by the detecting device, the signal strength values respectively at the variety of time points within a predetermined length of time; and
(b-2) for each of the detection signals, when a number of the signal strength values recorded in sub-step (b-1) is less than a predetermined minimum number, the detecting device randomly duplicating a part of the signal strength values recorded in sub-step (b-1), and placing the signal strength values thus duplicated among the signal strength values recorded in sub-step (b-1), such that a total number of the signal strength values is not less than the predetermined minimum number.

12. The proximity detection method of claim 1, further comprising steps of:
(f) receiving, by a calibration device, a calibration detection signal provided by a calibration signal providing device, wherein the calibration device and the calibration signal providing device are disposed apart from each other by a calibration distance in a same room, and the calibration distance is selected from a plurality of predetermined distances;
(g) for each of the predetermined distances serving as the calibration distance, collecting, by the calibration device, a plurality of calibration signal strength values of the calibration detection signal at a variety of time points;
(h) for each of the predetermined distances serving as the calibration distance, filtering out, the calibration device, a portion of the calibration signal strength values based on the predetermined criterion;
(i) acquiring a representative calibration signal strength value according to the calibration signal strength values that remain after step (h) and that correspond to one of the predetermined distances;
(j) acquiring a path loss exponent based on the calibration signal strength values that remain after step (h); and
(k) calculating, by the detecting device, a distance between the detecting device and the target signal providing device according to $S_i = -10\alpha \log_{10}(d_i) + S_0(d_0)$, where $S_i$ represents a representative signal strength value associated with the signal strength values of one of the detection signals that is provided by the target signal providing device, $\alpha$ is the path loss exponent, $d_i$ represents the distance between the detecting device and the target signal providing device, and $S_0(d_0)$ is the representative calibration signal strength value.

13. The proximity detection method of claim 12, wherein step (j) includes:
performing curve fitting on the calibration signal strength values that remain after step (h) with respect to each of the predetermined distances serving as the calibration distance to obtain a linear fitting curve; and
obtaining the path loss exponent based on the linear fitting curve.

14. The proximity detection method of claim 12, wherein, in step (d), for each of the detection signals, the corresponding signal level is calculated according to $\gamma_i = \Sigma(S_i - \min(S_k))$, where $\gamma_i$ represents the signal level corresponding to an $i^{th}$ one of the detection signals, $S_i$ represents one of the signal strength values of the $i^{th}$ one of the detection signals that remain after step (c), $S_k$ represents the signal strength values of all of the detection signals that remain after step (c); and the proximity calculated in step (e) includes proximity of the target signal providing device with respect to one of the at least one reference signal providing device, which is calculated according to $$P_{ij} = \frac{\gamma_i}{\gamma_i + \gamma_j},$$

where $P_{ij}$ represents the proximity of the target signal providing device with respect to a $j^{th}$ one of the at least one reference signal providing device, $\gamma_i$ represents the signal level of one of the detection signals that is provided by the target signal providing device, and $\gamma_j$ represents the signal level of one of the detection signals that is provided by the $j^{th}$ one of the at least one reference signal providing device;

said proximity detection method further comprising a step of:

(l) correcting, by the detecting device, the distance between the detecting device and the target signal providing device according to $$d'_i = \frac{(1 + P_{ij})^\alpha}{(1 + P_{ji})^\alpha} d_i,$$

where $d'_i$ represents the distance thus corrected, $d_i$ represents the distance calculated in step (k), $\alpha$ is the path loss exponent, $P_{ij}$ represents the proximity of the target signal providing device with respect to the $j^{th}$ one of the at least one reference signal providing device, and $P_{ji}$ represents proximity of the $j^{th}$ one of the at least one reference signal providing device with respect to the target signal providing device.

15. The proximity detection method of claim 14, wherein the $j^{th}$ one of the at least one reference signal providing device is a nearest one of the reference signal providing devices with respect to the detecting device.

16. The proximity detection method of claim 1, wherein step (b) includes sub-steps of:

for each of the detection signals, recording, by the detecting device, a plurality of the signal strength values of the detection signal at a variety of time points; and correcting, by the detecting device, each of the signal strength values, according to $$S_i = \frac{S_{io}}{\max(\cos\theta, 0.5)},$$

where $S_{io}$ represents the signal strength value recorded by the detecting device, $S_i$ represents the signal strength value thus corrected, and $\theta$ represents an angle between a directivity direction of an antenna of the detection device and a propagation direction of one of the detection signals that corresponds to the signal strength value.

* * * * *